(12) United States Patent
Miyashita et al.

(10) Patent No.: US 7,675,603 B2
(45) Date of Patent: Mar. 9, 2010

(54) SEAL STRUCTURE, SEAL METHOD, LIQUID CRYSTAL DEVICE, MANUFACTURING METHOD THEREOF, AND PROJECTOR

(75) Inventors: Takeshi Miyashita, Suwa (JP); Takaaki Tanaka, Matsumoto (JP)

(73) Assignee: Seiko Epson Corporation (JP)

( * ) Notice: Subject to any disclaimer, the term of this patent is extended or adjusted under 35 U.S.C. 154(b) by 954 days.

(21) Appl. No.: 11/376,675

(22) Filed: Mar. 15, 2006

(65) Prior Publication Data

US 2006/0215103 A1 Sep. 28, 2006

(30) Foreign Application Priority Data

| Mar. 28, 2005 | (JP) | ............................. 2005-092269 |
| Mar. 29, 2005 | (JP) | ............................. 2005-093429 |
| Nov. 15, 2005 | (JP) | ............................. 2005-329859 |

(51) Int. Cl.
*G02F 1/1339* (2006.01)

(52) U.S. Cl. ........................ 349/153; 349/122; 349/123; 349/5; 349/187; 349/190

(58) Field of Classification Search ................ 349/153, 349/6, 5, 7, 8, 11, 16, 56, 122, 187, 190, 349/191, 123
See application file for complete search history.

(56) References Cited

U.S. PATENT DOCUMENTS 5,898,041 A * 4/1999 Yamada et al. ................ 522/81

| 6,541,842 | B2 * | 4/2003 | Meynen et al. | ............... 257/632 |
| 7,294,373 | B2 * | 11/2007 | Tsuboi et al. | ............... 428/1.51 |
| 2001/0003631 | A1 * | 6/2001 | Villiger et al. | ............... 428/701 |
| 2004/0246429 | A1 * | 12/2004 | Liu et al. | ..................... 349/153 |
| 2006/0215103 | A1 * | 9/2006 | Miyashita et al. | ........... 349/153 |

FOREIGN PATENT DOCUMENTS

| CN | 1103043 | 5/1995 | ................. 349/153 |
| JP | 57-157214 | 9/1982 | ................. 349/187 |
| JP | 62-251720 | 11/1987 | ................. 349/153 |
| JP | 02-178628 | 7/1990 | ................. 349/153 |
| JP | 02-186322 | 7/1990 | ................. 349/153 |
| JP | 04-355720 | 12/1992 | ................. 349/153 |
| JP | 06-123882 | 5/1994 | ................. 349/153 |
| JP | 06-055134 | 7/1994 | ................. 349/153 |
| JP | 06-250184 | 9/1994 | ................. 349/153 |
| JP | 08-094985 | 4/1996 | ................. 349/187 |
| JP | 2005-181795 | 7/2005 | ................. 349/153 |
| WO | WO95/04709 | 2/1995 | ................. 349/153 |

\* cited by examiner

*Primary Examiner*—Brian M Healy
(74) *Attorney, Agent, or Firm*—Harness, Dickey & Pierce, P.L.C.

(57) ABSTRACT

A liquid crystal device of the present invention includes a pair of substrates, a liquid crystal layer that is provided between the pair of substrates, a first seal material that is arranged along the periphery of the liquid crystal layer between the pair of substrates and seals the liquid crystal layer, and a second seal material that is arranged along the periphery of the liquid crystal layer between the pair of substrates and has water-hardening properties.

13 Claims, 10 Drawing Sheets

SEAL STRUCTURE, SEAL METHOD, LIQUID CRYSTAL DEVICE, MANUFACTURING METHOD THEREOF, AND PROJECTOR

CROSS-REFERENCE TO RELATED APPLICATION

This application claims priority to Japanese Patent Application No. 2005-92269, filed Mar. 28, 2005, No. 2005-93429, filed Mar. 29, 2005, and No. 2005-329859, filed Nov. 15, 2005, the contents of which are incorporated herein by reference.

BACKGROUND

1. Technical Field

The present invention relates to a seal structure, a seal method, a liquid crystal device, a manufacturing method thereof, and a projector.

2. Related Art

In a liquid crystal device that is used as a light-modulation unit in a projection-type display device such as a liquid crystal projector, a sealing material is provided along a peripheral part between a pair of substrates and a liquid crystal layer is sealed in the center. An electrode for applying a voltage to the liquid crystal layer is provided on the insides of the pair of substrates. An alignment film is provided on the inner side of the electrode, and controls the alignment of the liquid crystal polymer when applying a nonselective voltage. Based on change in the alignment of the liquid crystal polymer when applying a nonselective voltage and when applying a selective voltage, light from a light source is modulated to produce image light.

A high-polymer film of polyimide with an added side-chain alkyl group whose surface has been processing by rubbing can be used as the alignment film. In this rubbing process, the surface of the high-polymer film is rubbed in a predetermined direction using a roller consisting of a soft cloth, so that the high-polymers are aligned in a predetermined direction. The liquid crystal polymers are distributed along the aligned high-polymers due to a reciprocal effect between the high-polymers and the liquid crystal polymers. That is, the liquid crystal polymers are aligned in the predetermined direction when a nonselective voltage is applied. The side-chain alkyl group imparts a pre-tilt to the liquid crystal polymer.

When a liquid crystal device including an organic alignment film is used as a light-modulating unit in a projector, there is a possibility that the alignment film gradually breaks down due to heat and strong light emitted from the light source. After the liquid crystal projector is used for a long period of time, the alignment control function of the liquid crystal polymers may deteriorate (e.g., the liquid crystal polymers may not be arranged at the desired pre-tilt angle), with a consequent deterioration in the display quality of the liquid crystal projector.

Accordingly, an alignment film consisting of an inorganic substance having excellent light-resistant and heat-resistant properties is being considered for use. Proposed methods for manufacturing an inorganic film include ion bean sputtering and diagonal evaporation (e.g., see Japanese Unexamined Patent Application, First Publication No. 57-157214). In these methods, particles of the inorganic substance are injected to a substrate at a predetermined incidence angle, forming an inorganic alignment film consisting of column-like structural bodies of the inorganic substance. In a liquid crystal device, the liquid crystal polymers are aligned along the column-like structural bodies of the inorganic alignment film. That is, the inorganic alignment film controls alignment and imparts a pre-tilt to the liquid crystal polymers.

To seal a liquid crystal layer between the pair of substrates, a seal material must be provided on the surface of the inorganic alignment film. However, since the inorganic alignment film consists of column-like structural bodies, the inorganic alignment is porous; hence there is a possibility that a comparatively large gap is formed at the interface between the seal material and the inorganic alignment film. When water, impurities, and the like from outside the liquid crystal device infiltrate the liquid crystal layer through this gap, they inhibit the alignment control function of the liquid crystal polymers, mainly in the liquid crystal device. This reduces the reliability of the liquid crystal projector.

SUMMARY

An advantage of some aspects of the invention is to provide a seal structure which can reduce the possibility of infiltration by water, impurities, and such like, a seal method, a liquid crystal device, and a manufacturing method thereof. Another advantage of some aspects of the invention is to provide a projector having excellent reliability.

A seal structure according to an aspect of the invention is a seal structure for a porous layer, including a first seal material arranged on a surface of the porous layer, and a second seal material arranged on the surface of the porous layer and has water-hardening properties.

According to this configuration, the second seal material absorbs water, thereby preventing water from infiltrating the interface between the first seal material and the porous layer, and from infiltrating the porous layer.

A liquid crystal device according to an aspect of the invention includes a pair of substrates, a liquid crystal layer arranged between the pair of substrates, a first seal material arranged around the liquid crystal layer between the pair of substrates and seals the liquid crystal layer, and a second seal material arranged around the liquid crystal device between the pair of substrates and has water-hardening properties.

According to this configuration, the second seal material absorbs water, preventing it from infiltrating the liquid crystal layer from outside the liquid crystal device.

It is preferable that porous alignment films be formed on inner faces of the substrates.

According to this configuration, water is prevented from infiltrating the liquid crystal layer through the interfaces between the first seal material and the alignment films, and from infiltrating the liquid crystal layer through the alignment film It is preferable that the second seal material be arranged on the outer side of the first seal material.

According to this configuration, the second seal material is reliably hardened by exposing it to the outside.

It is preferable that the second seal material have a metal alkoxide as its main compound.

According to this configuration, the second seal material absorbs water and hardens reliably.

A method for manufacturing a liquid crystal device according to an aspect of the invention obtains a liquid crystal device in which a liquid crystal layer is sealed between a pair of substrates. The method includes joining the pair of substrates together with a first seal material therebetween, and arranging a second seal material that has water-hardening properties around the liquid crystal layer between the pair of substrates.

According to this configuration, there is provided a liquid crystal device wherein the arrangement of the second seal material prevents water from infiltrating the liquid crystal layer.

A seal method according to an aspect of the invention includes arranging a seal material on a surface of a porous layer, and imparting affinity for the seal material to a region of the porous layer where the seal material is arranged.

According to this configuration, the porous layer is easily filled with the seal material, thereby preventing water from infiltrating through the interface between the seal material and the porous layer, and from infiltrating the porous layer itself.

A method for manufacturing a liquid crystal device according to an aspect of the invention obtains a liquid crystal device in which a liquid crystal layer is sealed between a first substrate and a second substrate. The method includes joining together the first substrate and the second substrate with a seal material therebetween, and imparting affinity for the seal material to regions of the first substrate and the second substrate where the seal material is arranged.

According to this configuration, the substrates have good wettability with respect to the seal material, thereby reducing the possibility that water and such like will infiltrate the liquid crystal layer.

It is preferable that affinity for the seal material be imparted only to the regions of the first substrate and the second substrate where the seal material is arranged.

According to this configuration, only the regions for arranging the seal material are activated, thereby preventing moisture-absorbing properties from being imparted to other regions.

It is preferable that affinity for the seal material be imparted to porous alignment films that are formed on the first substrate and the second substrate.

According to this configuration, the alignment films have good wettability with respect to the seal material, thereby preventing water from infiltrating the liquid crystal layer through the interfaces between the seal material and the alignment films, and preventing water from infiltrating the liquid crystal layer through the alignment films themselves.

In one embodiment, the step of imparting affinity for the seal material includes a step of irradiating light onto the first substrate and the second substrate, a step of plasma-processing the first substrate and the second substrate, and a step of applying a surface-modifying agent to the first substrate and the second substrate.

A liquid crystal device according to an aspect of the invention uses the method for manufacturing a liquid crystal device described above.

According to this configuration, it is possible to provide a liquid crystal device wherein there is only a slightly possibility that water and such like will infiltrate the liquid crystal layer.

A projector according to an aspect of the invention includes the liquid crystal device described above as a light-modulation unit.

According to this configuration, it is possible to provide a projector that has excellent reliability.

BRIEF DESCRIPTION OF THE DRAWINGS

FIG. 5B is a side cross-sectional view showing a substrate which an inorganic alignment film has been formed on.

DESCRIPTION OF EXEMPLARY EMBODIMENTS

Exemplary embodiments of the present invention will be explained with reference to the drawings. In each of the drawings used in the following explanation, the sizes of the various members are changed wherever appropriate to ensure that they are large enough to be recognized. In this application, a liquid crystal layer side of each of the constituent members of a liquid crystal device is termed 'the inner side', and a side opposite thereto is termed 'the outer side'. The meanings of the terms 'when a nonselective voltage is applied' and 'when a selective voltage is applied' are, respectively, 'when the voltage applied to the liquid crystal layer is near the threshold voltage of the liquid crystal' and 'when the voltage applied to the liquid crystal layer is sufficiently high in comparison with the threshold voltage of the liquid crystal'.

First Embodiment

Figure 6A:
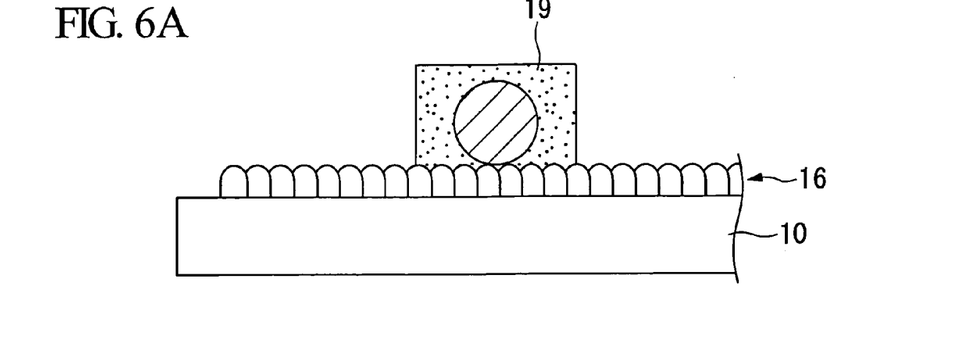
FIGS. 6A, 6B, and 6C are explanatory diagrams showing a seal structure according to the first embodiment.
Figure 6B:
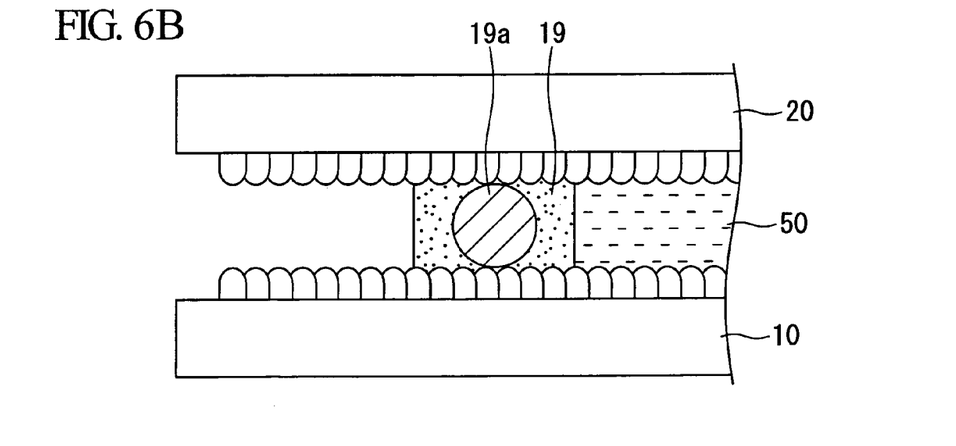
Figure 6C:
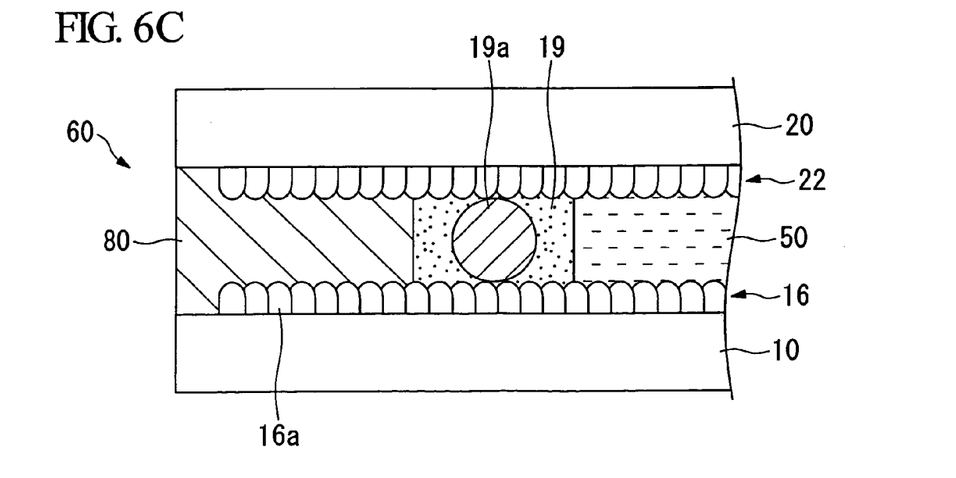

A first embodiment of this invention will be explained. In FIGS. 6A to 6C, a liquid crystal device 60 according to a first embodiment includes a first seal material 19 which is provided along peripheral parts between a pair of substrates 10 and 20, and a liquid crystal layer 50 which is sealed in a center part. A second seal material 80 consists of a water-hardening material, and is provided over the outer side of the first seal material 19 between the substrates 10 and 20. The liquid crystal device 60 of this embodiment is a transparent-type active matrix liquid crystal device which uses a thin film transistor (TFT) element as a switching element.

Liquid Crystal Device

Figure 1:
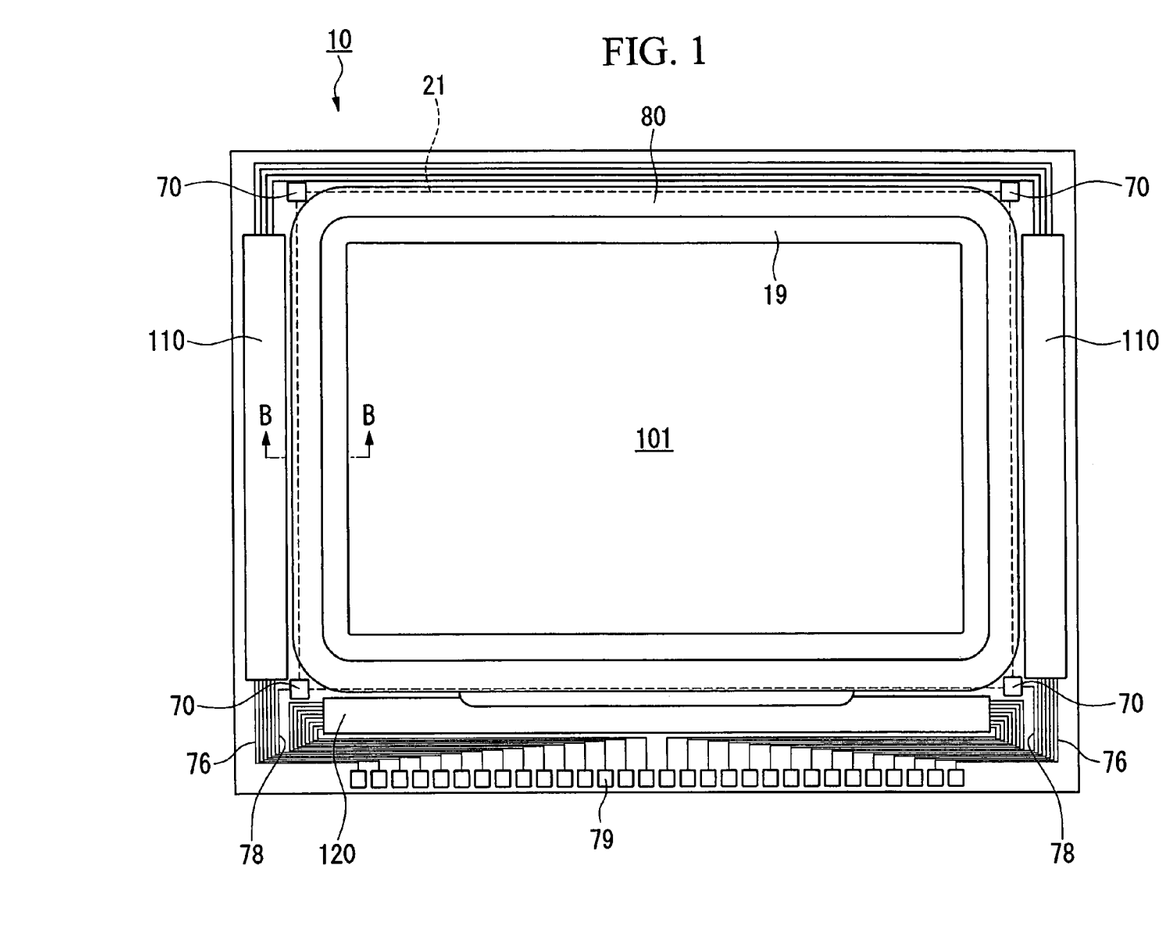
FIG. 1 is a plan view showing a TFT array substrate of a liquid crystal device according to a first embodiment.

FIG. 1 is a plan view of a TFT array substrate of a liquid crystal device. An image creation region 101 is formed in a center part of a TFT array substrate 10. The first seal material 19 is arranged around the peripheral part of the image creation region 101. A liquid crystal layer 50 (see FIG. 4) is sealed in the image creation region 101. The liquid crystal layer 50 is formed by coating the substrate directly with liquid crystals, and there are no injection holes in the first seal material 19. A second seal material 80 is arranged outside the first seal material 19, and is a characteristic feature of this embodiment. A scan line drive element 110 which supplies a scan signal to scan lines (explained below) and a data line drive element 120 which supplies an image signal to data lines (explained below) are attached to the outer side of the second seal material 80. The drive elements 110 and 120 are electrically connected to connection terminals 79 of a terminal part of the TFT array substrate 10 by interconnections 76.

A common electrode 21 is formed on the opposing substrate 20 (see FIG. 4) which is joined to the TFT array substrate 10. The common electrode 21 is formed over almost the entire image creation region 101. Inter-substrate conductive sections 70 are provided at the four corners of the common electrode 21. The inter-substrate conductive sections 70 are electrically connected to the connection terminals 79 by interconnections 78. The liquid crystal device is driven by externally inputting various types of signals and supplying them to the image creation region 101.

Equivalent Circuit

Figure 2:
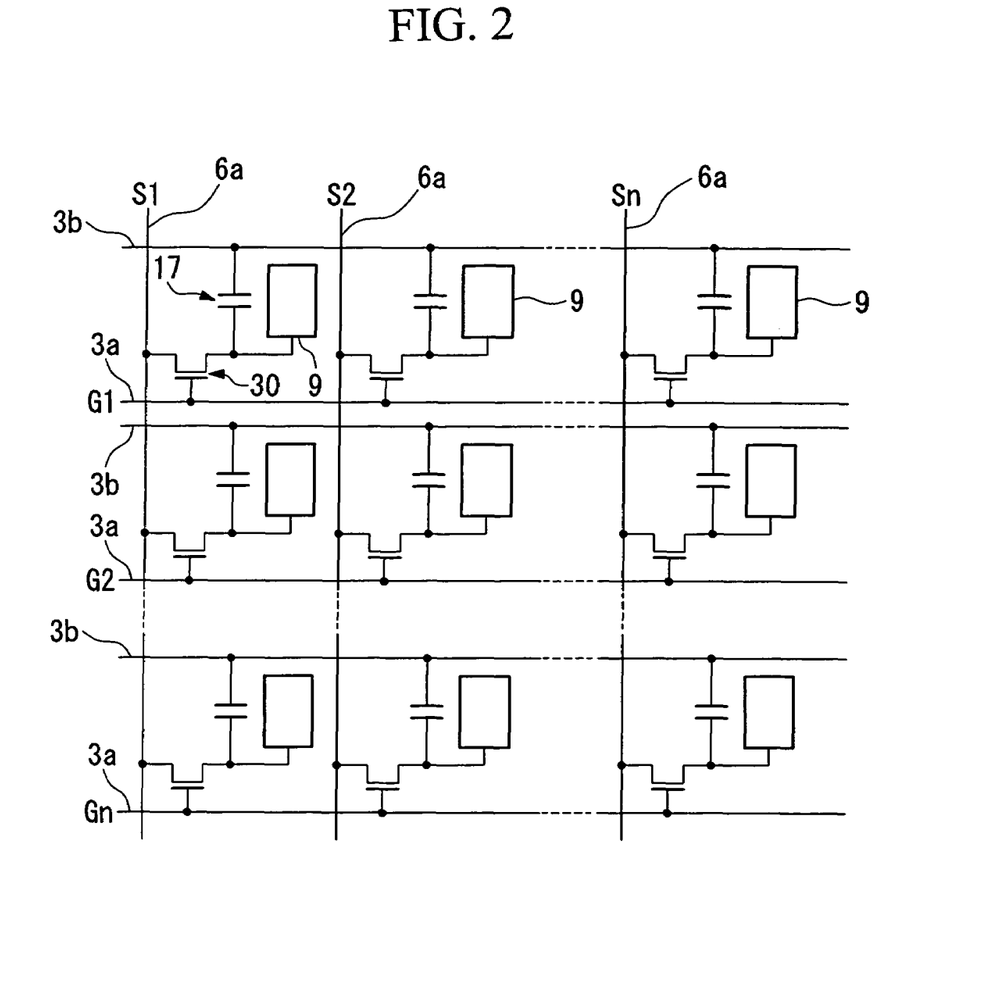
FIG. 2 is an equivalent circuit diagram showing a liquid crystal device.

FIG. 2 is an equivalent circuit diagram of a liquid crystal device. An image creation region of the transparent type liquid crystal device includes a plurality of dots which are arranged in a matrix formation, with a pixel electrode 9 formed at each dot. A TFT element 30 including a switching element is formed beside each pixel electrode 9, and controls the conduction of current to the pixel electrode 9. A data line 6*a* is connected to the source of each TFT element 30. Image signals S1, S2, . . . , and Sn from the data line drive element mentioned above are supplied to the data lines 6*a*.

A scan line 3*a* is connected to the gate of each TFT element 30. Scan signals G1, G2, . . . , and Gm are supplied in a pulse at a predetermined timing from the abovementioned scan line drive element to the scan lines 3*a*. The pixel electrodes 9 are connected to the drains of the TFT elements 30. In accordance with these scan signals G1, G2, . . . , and Gm supplied from the scan lines 3*a*, when the TFT element 30 including the switching element is on for a fixed period of time, the image signals S1, S2, . . . , and Sn supplied from the data lines 6*a* are written via the pixel electrodes 9 in the crystals of the dots at predetermined timings.

The image signals S1, S2, . . . , and Sn, which have predetermined levels and are written in the crystals, are held for a fixed period of time in the crystal capacitor formed between the pixel electrodes 9 and a common electrode described below. To prevent leakage of the image signals S1, S2, . . . , and Sn being held, a storage capacitor 17 is arranged in parallel with the liquid crystal capacitor between the pixel electrode 9 and a capacitor line 3*b*. When a voltage signal is applied to the liquid crystal, the alignment of the liquid crystal polymers changes. The light from the light source which is incident on the liquid crystals is thereby modulated, and image light is created.

Plan Structure

Figure 3:
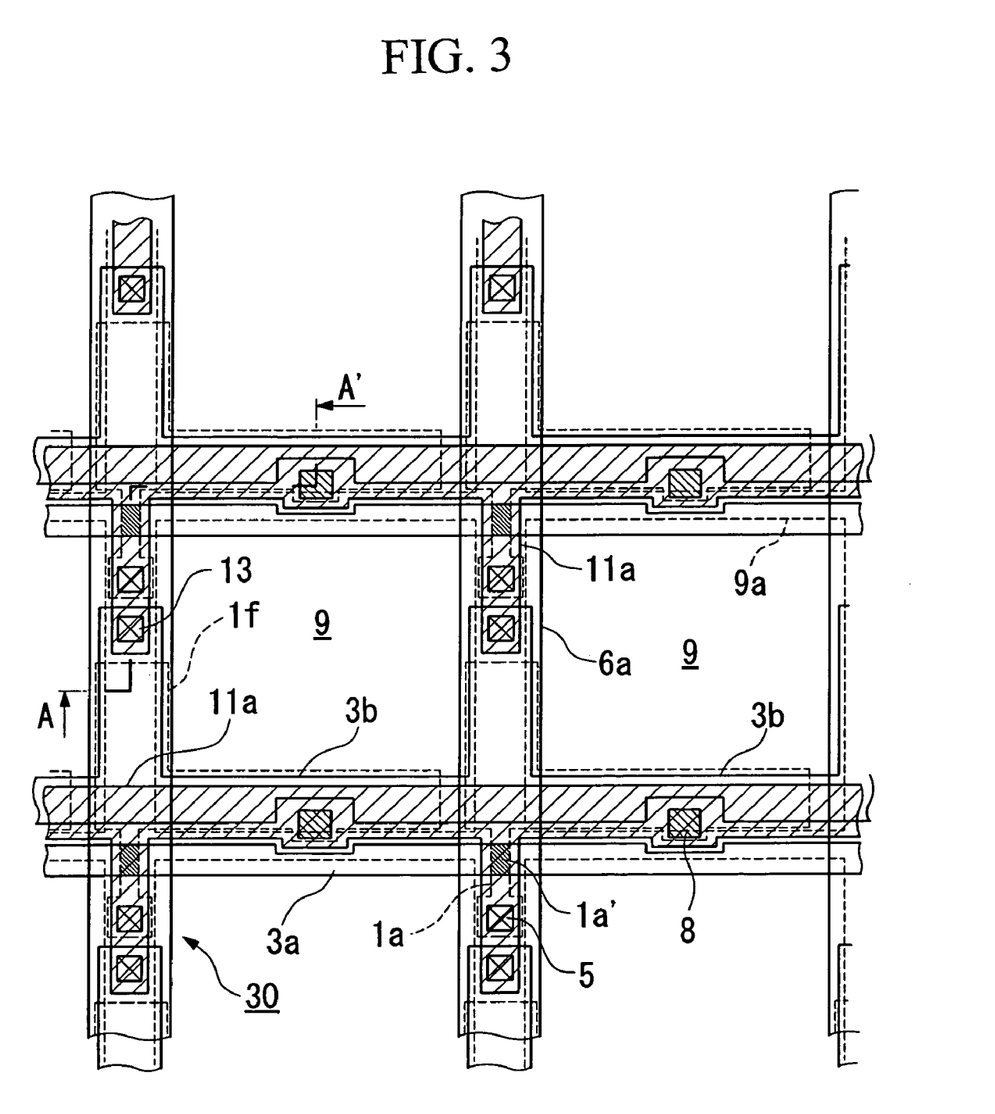
FIG. 3 is an explanatory diagram showing a plan structure of a liquid crystal device.

FIG. 3 is an explanatory view of the plan structure of the liquid crystal device. In the liquid crystal device of this embodiment, the plurality of pixel electrodes 9 (their outlines represented by broken lines 9*a*) are arranged in a matrix on the TFT array substrate. The pixel electrodes 9 are square, and consist of a transparent conductive material such as indium tin oxide (hereinafter ITO). The data lines 6*a*, the scan lines 3*a*, and the capacitor lines 3*b* are provided along the vertical and horizontal interfaces of the pixel electrodes 9 on the TFT array substrate. In this embodiment, the square regions where the pixels electrode 9 are formed are the dots, and each of the dots arranged in the matrix formation is a display region.

The TFT element 30 is formed around a core consisting of a semiconductor layer 1*a* made from polysilicon or the like. The data line 6*a* connects via a contact hole 5 to a source region (explained below) of the semiconductor layer 1*a*. The pixel electrode 9 connects via a contact hole 8 to a drain region (explained below) of the semiconductor layer 1*a*. A channel region 1*a*' is formed in a section of the semiconductor layer 1*a* opposite to the scan line 3*a*.

Cross Sectional Structure

Figure 4:
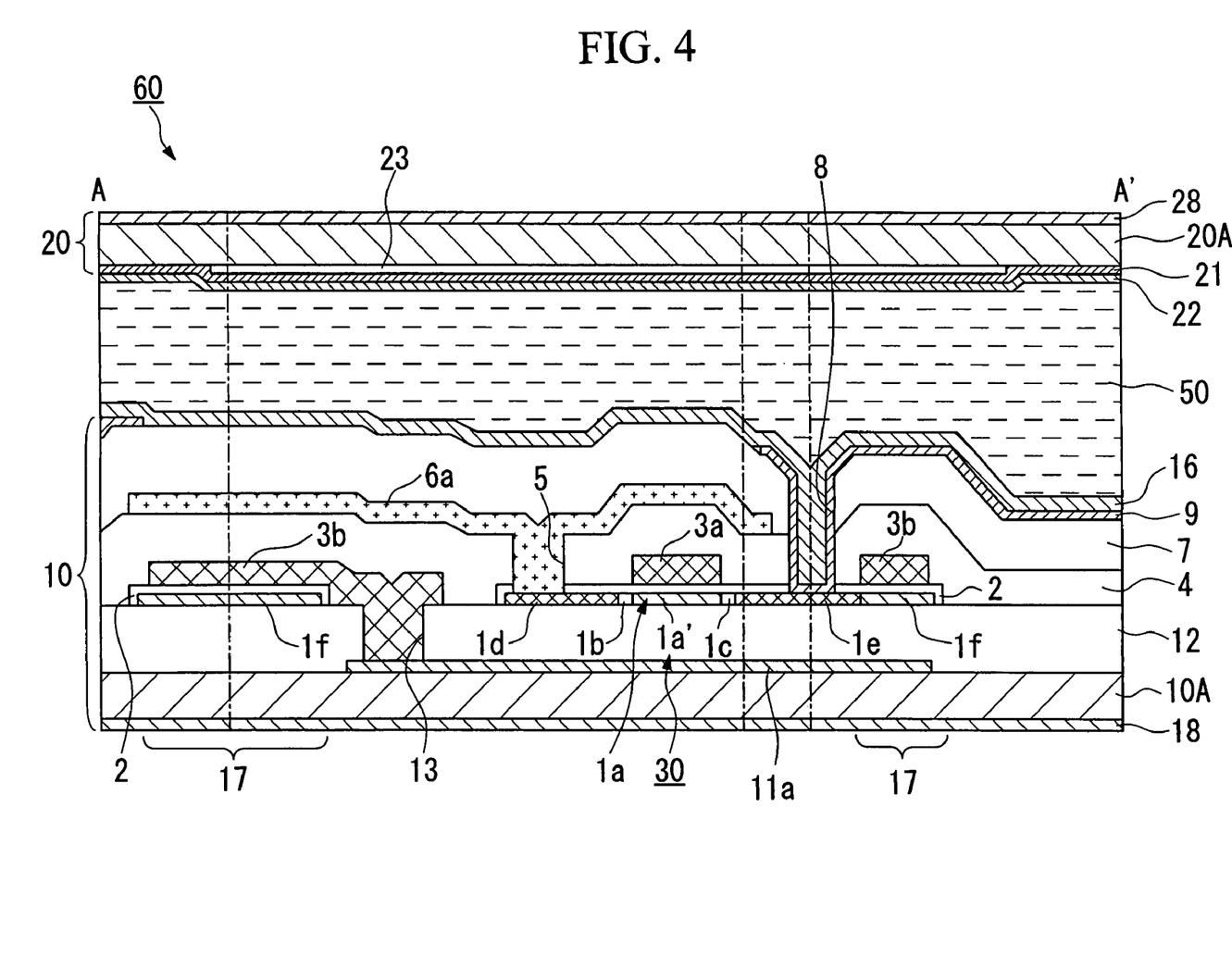
FIG. 4 is an explanatory diagram showing a cross-sectional structure of a liquid crystal device.

FIG. 4 is an explanatory view of the cross-sectional structure of the liquid crystal device, being a side cross-sectional view taken along the line A-A' of FIG. 3. As shown in FIG. 4, the liquid crystal device 60 of this embodiment includes the TFT array substrate 10, the opposing substrate 20 which is arranged opposite the TFT array substrate 10, and the liquid crystal layer 50 which is sandwiched between the TFT array substrate 10 and the opposing substrate 20. The TFT array substrate 10 includes a substrate body 10A consisting of a transparent material such as glass or quartz, and the TFT element 30, the pixel electrode 9, and an alignment film 16, which are formed on the inner side of the substrate body 10A. The opposing substrate 20 includes a substrate body 20A consisting of a transparent material such as glass or quartz, and a common electrode 21 and an alignment film 22 which are formed on the inner side of the substrate body 20A.

A first light-blocking film 11*a* and a first interlayer insulating film 12 are disposed on the surface of the TFT array substrate 10. The first light-blocking film 11*a* is disposed on the surface of the first interlayer insulating film 12, and the TFT element 30 is formed with the semiconductor layer 1*a* at its core. The channel region 1*a*' is formed in a section of the semiconductor layer 1*a* opposite the scan line 3*a*. A source region is formed at one terminal side of the channel region 1*a*', and a drain region is formed at another terminal side. This TFT element 30 uses a lightly doped drain (LDD) structure. Consequently, a region of relatively high impurity density and a region of relatively low impurity density region (LDD) are formed in both the source region and the drain region. That is, a low-density source region 1*b* and a high-density source region 1*d* are formed in the source region, and a low-density drain region 1*c* and a high-density drain region 1*e* are formed in the drain region.

A gate insulating film 2 is disposed on the surface of the semiconductor layer 1*a*. The scan line 3*a* is formed on the surface of the gate insulating film 2. A gate electrode is formed in a part of the scan line 3*a* which is opposite to the channel region 1*a*'. A second interlayer insulating film 4 is disposed on the surfaces of the gate insulating film 2 and the scan line 3*a*. The data line 6*a* is formed on the surface of the second interlayer insulating film 4. The data line 6*a* is connected to the high-density source region 1*d* via the contact hole 5 in the second interlayer insulating film 4. A third interlayer insulating film 7 is disposed on the surfaces of the second interlayer insulating film 4 and the data line 6*a*. The pixel electrode 9 is formed on the surface of the third interlayer insulating film 7. The pixel electrode 9 and the high-density drain region 1*e* are connected together via the contact hole 8 in the second interlayer insulating film 4 and the third interlayer insulating film 7. The alignment film 16 covers the pixel electrode 9. The alignment film 16 controls the alignment of the liquid crystal polymers when a nonselective voltage is applied.

In this embodiment, a first storage capacitor electrode 1*f* is formed by extension of the semiconductor layer 1*a*. A dielectric film is formed by extension of the gate insulating film 2. The capacitor line 3*b* is arranged on the surface of this dielectric film, forming a second storage capacitor electrode. This configuration forms the storage capacitor mentioned 17 above.

The first light-blocking film 11*a* is disposed on the surface of the sloping face 10*a* which corresponds to the region where the TFT element 30 is formed. The first light-blocking film 11*a* prevents light which is incident on the liquid crystal device from infiltrating the channel region 1*a*', the low-density source region 1*b*, and the low-density drain region 1*c*.

A second light-blocking film 23 is formed on the surface of the substrate body 20A of the opposing substrate 20. The second light-blocking film 23 prevents light which is incident upon the liquid crystal device from infiltrating the channel region 1a', the low-density source region 1b, the low-density drain region 1c, and the like, and, in plan view, is provided in a region which overlaps with the semiconductor layer 1a. The surface of the opposing substrate 20 is almost completely covered by the common electrode 21, which consists of a conductor such as ITO. The inorganic alignment film 22 is formed on the surface of the common electrode 21. The inorganic alignment film 22 controls the alignment of the liquid crystal polymers when a nonselective voltage is applied.

The liquid crystal layer 50 consists of nematic liquid crystal, and is sandwiched between the TFT array substrate 10 and the opposing substrate 20. Nematic liquid crystals have positive dielectric constant anisotropy, aligning horizontally along the substrate when a nonselective voltage is applied and aligning vertically in the electrical field direction when a selective voltage is applied. Nematic liquid crystals have positive refractive index anisotropy, the retardation Δnd of the double refraction and the thickness of the liquid crystal layer being, for example, approximately 0.40 μm (60° C.). The alignment control direction of the alignment film 16 of the TFT array substrate 10 and the alignment control direction of the alignment film 22 of the opposing substrate 20 are twisted at an angle of approximately 90°. The liquid crystal device 60 of this embodiment consequently functions in a twisted nematic mode.

Polarization plates 18 and 28 consisting of polyvinyl alcohol (PVA) doped with iodine are arranged on the outer sides of the substrates 10 and 20. The polarization plates 18 and 28 should be attached on supporting substrates of a highly heat-conductive material such as sapphire, glass, or crystal, and arranged at a distance from the liquid crystal device 60. The polarization plates 18 and 28 absorb linearly polarized light in their absorption axis directions, and transmit linearly polarized light in their transmission axis directions. The polarization plate 18 of the TFT array substrate 10 is arranged such that its transmission axis approximately matches the alignment control direction of the alignment film 16. The polarization plate 28 of the TFT array substrate 10 is arranged such that its transmission axis approximately matches the alignment control direction of the alignment film 22.

The liquid crystal device 60 is arranged with the opposing substrate 20 facing the light source side. Only linearly polarized light which matches the transmission axis of the probe position detector 28 at the light source is transmitted through the probe position detector 28 and becomes incident on the liquid crystal device 60. When a nonselective voltage is applied to the liquid crystal device 60, liquid crystal polymers which are horizontally aligned to the substrate are laminated in a twisted line at approximately 90° to the direction of the thickness of the liquid crystal layer 50. The linearly polarized light which is incident on the liquid crystal device 60 is rotated by approximately 90° before being emitted from it. Since this linearly polarized light matches the transmission axis of the polarization plate 18, the light is transmitted through the plate 18. Therefore, when a nonselective voltage is applied, the liquid crystal device 60 displays a white display (normally white mode).

When a selective voltage is applied to the liquid crystal device 60, the liquid crystal polymers are aligned vertically with respect to the substrates. The linearly polarized light which is incident on the liquid crystal device 60 is emitted from the liquid crystal device 60 without being rotated. Since this linearly polarized light is at a right-angle to the transmission axis of the polarization plate 18, it is not transmitted through it. Therefore, when a selective voltage is applied, the liquid crystal device 60 displays a black display.

Inorganic Alignment Film

As described above, the inorganic alignment films 16 and 22 are formed on the insides of the substrates 10 and 20. The inorganic alignment film 16 of the TFT array substrate 10 will be explained below. The inorganic alignment film 22 of the opposing substrate 20 has the same configuration.

The inorganic alignment film 16 consists of a silicon oxide such as $SiO_2$ and SiO, a metal oxide such as $Al_2O_3$, ZnO, MgO, and ITO, or the like, and has a thickness of between 0.02 and 0.3 μm (preferably between 0.02 and 0.08 μm). The inorganic alignment film 16 can be manufactured using a sputtering method such as ion beam sputtering or magnetron sputtering, or by a method such as evaporation, sol-gel, and self-assembly. In the explanation below, the inorganic alignment film 16 is manufactured by ion beam sputtering.

Figure 5A:
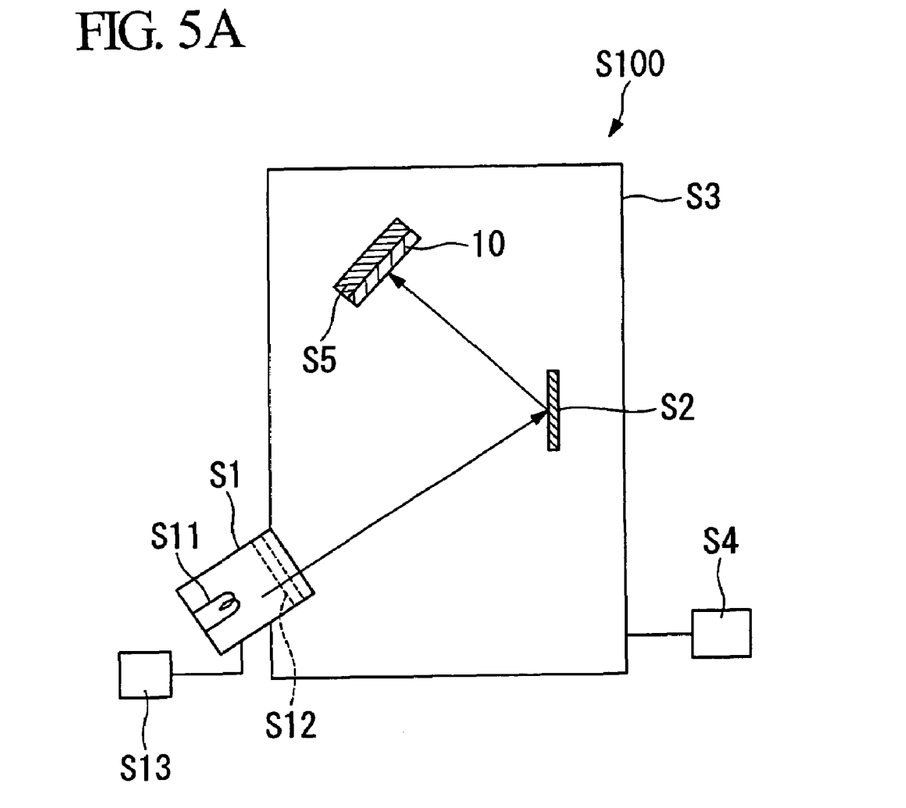
FIG. 5A is a pattern diagram view showing an ion beam sputtering device.

FIG. 5A is a pattern diagram of an ion beam sputtering device. An ion beam sputtering device S100 includes an exhaust pump S4 which controls a vacuum chamber S3 and the internal pressure therein, a substrate holder S5 which secures the substrate 10 in the vacuum chamber S3, a target S2 which discharges sputter particles toward the substrate 10, and an ion source S1 which emits an ion beam toward the target S2. A gas supply source S13 is connected to an ion source S1. A filament S11 and an extraction electrode S12 are provided inside the ion source S1.

An inorganic alignment film is formed using the ion beam sputtering device S100 by the following procedure. Firstly, the substrate 10 is secured to the substrate holder S5 inside the vacuum chamber S3, and the pressure inside the vacuum chamber S3 is reduced using the exhaust pump S4. Next, the gas supply source S13 supplies a rare gas such as argon gas into the ion source S1, and thermal electrons are generated by applying a voltage to the filament S11. The thermal electrons collide with the rare gas, generating plasma at the ion source S1. An ion-accelerating voltage is then applied to the extraction electrode S12, accelerating the speed of the ions generated by the plasma. As a result, an ion beam is emitted from the ion source S1. This ion beam strikes the target S2, where sputter particles consisting of material for forming the inorganic alignment film travel toward the substrate 10. These sputter particles are deposited on the substrate 10 where they form an inorganic alignment film.

The pressure inside the vacuum chamber S3 should preferably be no higher than $5*10^{-1}$ Pa, and more preferably no higher than $5*10^{-2}$ Pa. If this voltage is too high, the tendency of the sputter particles to advance directly will decrease. The temperature of the substrate 10 should preferably be no higher than 150° C., and more preferably no higher than 100° C.; even more preferably, it should be between 50 and 80° C. Keeping the substrate 10 at a comparatively low temperature suppresses a phenomenon known as migration, in which the sputter particles which are deposited on the substrate 10 move from their initial positions. The ion-acceleration voltage applied to the extraction electrode S12 should preferably be between 400 and 3000 V, and more preferably between 800 and 2000 V. If the ion-acceleration voltage is too low, the sputter rate will decrease; if it is too high, the film will be less evenly formed.

Figure 5B:
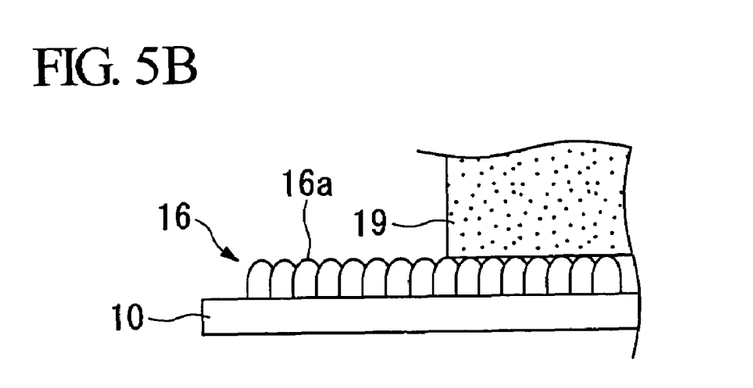

FIG. 5B is a side cross-sectional view of a substrate on which an inorganic alignment film has been formed. When sputter particles are continuously incident upon the substrate 10 at a substantially constant incidence angle, the sputter particles accumulate in a diagonal column-like formation, forming column-like structural bodies 16a of the inorganic substance. A countless number of these column-like structural bodies 16a are formed on the surface of the substrate 10, thereby forming the inorganic alignment film 16. The incidence of the sputter particles against the substrate 10 can be set to a predetermined angle by adjusting the angle between the target S2 and the substrate 10 shown in FIG. 5A, making it possible to impart a predetermined gradient angle to the column-like structural bodies 16a shown in FIG. 5B. That is, the inorganic alignment film 16 restricts the alignment of the liquid crystal polymers to a predetermined direction when a nonselective voltage is applied, and gives them a pre-tilt.

It is acceptable to form a plurality of sloping faces beforehand on the ground film face of the inorganic alignment film and then sputter the inorganic alignment film onto that face, so that the shape of the plurality of sloping faces is transmitted to the surface of the inorganic alignment film. After sputtering the inorganic alignment film, ion milling process, in which the ion beam is applied at a predetermined angle, may be performed, and thereby form concavities having a predetermined directionality in the surface of the inorganic alignment film. It is also acceptable to perform ion milling on the ground film face, subsequently form the inorganic alignment film by sputtering, and then perform ion milling again over this surface, thereby forming concavities in the surface of the inorganic alignment film. In each of these procedures for providing the inorganic alignment film 16, the liquid crystal polymers can reliably be given the desired pre-tilt.

Seal Structure

FIGS. 6A to 6C are explanatory diagrams of a seal structure according to this embodiment, being side cross-sectional views taken along the line B-B of FIG. 1. As shown in FIG. 1, the first seal material 19 is arranged along the peripheral part of the TFT array substrate 10, and a liquid crystal layer is sealed in the center.

As shown in FIG. 6C, the abovementioned inorganic alignment films 16 and 22 are formed on the inner sides of the substrates 10 and 20. The first seal material 19 is arranged around the periphery of the liquid crystal layer 50 between the inorganic alignment films 16 and 22. The first seal material 19 consists of a material made by mixing a hardening agent in a heat-hardening resin such as epoxy, or by further mixing an ultraviolet-curing resin such as acryl. A spherical gap material 19a is dispersed over the first seal material 19 to realize a predetermined liquid crystal layer thickness (cell gap).

Figure 7A:
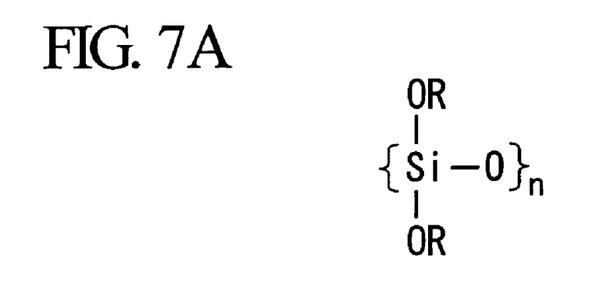
FIGS. 7A, 7B, and 7C are chemical formulas showing organic silicon compounds.
Figure 7B:
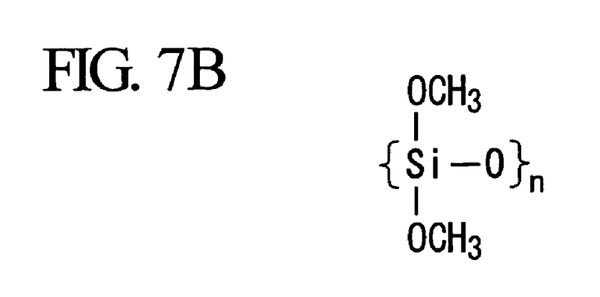
Figure 7C:
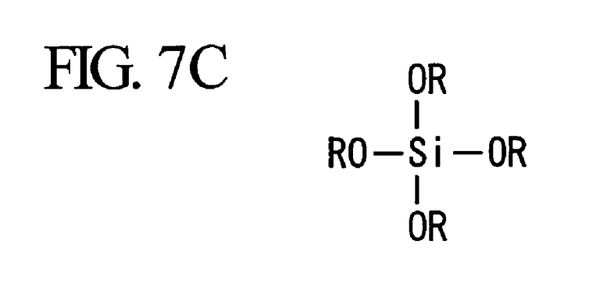

The second seal material 80 is arranged around the periphery of the liquid crystal layer 50 between the inorganic alignment films 16 and 22, i.e., the outer side of the first seal material 19. The second seal material 80 includes a water-hardening material which hardens as it absorbs water. A material having a metal alkoxide containing silicon as its main compound should preferably be used as this water-hardening material. That is, the base compound used is an organic silicon compound such as polydialkoxysiloxane expressed by the chemical formula of FIG. 7A, polydimethoxysiloxane of FIG. 7B, or tertaalkoxysilane of FIG. 7C. In addition to the base compound, a water-hardening material also includes a cross-linking agent and a hardening catalyst; colorants, aggregates, and such like are also added when required. @Terioscoat NP-360QD made by Nikko Manufacturing Corp is a specific example of a water-hardening material which can be used. This is a silicon solution with a silicon component of not less than 90% by weight, used as a coating material which forms a hard amorphous glass film at ordinary temperature.

By way of example, there follows an explanation of the hardening mechanism when a base compound of tertaalkoxysilane ($S_i(OR)_4$) is used with a halogen (X) as a hardening catalyst.

$$Si(OR)_4 + BX^{4-} + 2H_2O \rightarrow SiX^{4-} + 4ROH + B^{3+} \quad (1)$$

$$SiX^{4-} + 2H_2O \rightarrow Si(OH)_4 + 4X^{-} \quad (2)$$

$$Si(OH)_4 \rightarrow SiO_2 + 2H_2O \quad (3)$$

In formula (1), the $BX^{4-}$ ions are easily displaced by Si to become $SiX^{4-}$ ions, which facilitate the hydrolytic reaction of formula (2) and the dehydrating condensation reaction of formula (3). As a result, the material hardens at ordinary temperature to create a glass ($SiO_2$). More water ($H_2O$) is consumed by formulas (1) and (2) than is created by formula (3). The material consequently absorbs water and hardens.

Subsequently, a method for manufacturing the liquid crystal device according to this embodiment will be explained using FIGS. 6A to 6C. In FIG. 6A, the surface of the inorganic alignment film 16 formed on the substrate 10 is coated with the first seal material 19.

In FIG. 6B, the inner side of the first seal material 19 is coated with liquid crystal to form the liquid crystal layer 50. The liquid crystal can be applied using an ink jet method or the like. The TFT array substrate 10 and the opposing substrate 20 are then joined together, and the first seal material 19 is hardened. Since the first seal material 19 includes either or both of a thermosetting resin and an ultraviolet-curing resin, it can be hardened by applying either or both of heat and infrared rays. This secures the relative positions of the TFT array substrate 10 and the opposing substrate 20, and obtains a liquid crystal layer with a predetermined thickness due to the gap material 19a which is dispersed in the first seal material 19. Liquid crystal injection holes may be provided in the first seal material, enabling the liquid crystal to be injected after joining together the substrates 10 and 20.

In FIG. 6C, the second seal material 80 is arranged over the outer side of the first seal material 19. Specifically, a dispenser or the like is used to apply a water-hardening material from the side faces of the substrates 10 and 20, which are joined together with the first seal material 19 therebetween, into the gap between them. Since the gap between the substrates 10 and 20 is approximately several μm, the water-hardening material fills this gap by a capillary effect. The water-hardening material absorbs water and hardens at ordinary temperature, forming the second seal material 80 along the peripheral part between the substrates 10 and 20. Preferably, the second seal material 80 should be applied in a state of low viscosity, and the second seal material 80 filled into the gaps between the column-like structural bodies 16a of the inorganic alignment film 16. The second seal material 80 may be applied with the first seal material 19 to the surface of the TFT array substrate 10, before joining the TFT array substrate 10 to the opposing substrate 20. The coating of water-hardening material may also be hardened by drying.

The liquid crystal device of this embodiment is completed by the above procedures.

Since the inorganic alignment film 16 consisting of the column-like structural bodies 16a in FIG. 5B is porous, there is a possibility that a gap may form between the first seal material 19 and the substrate 10. A comparatively large gap is particularly likely to form at the interface between the first seal material 19 and the inorganic alignment film 16. If water, impurities, and the like from the outside infiltrate the liquid crystal layer through such a gap, the functions of the liquid crystal device will be inhibited. In particular, the alignment of the liquid crystals, which have a polarized structure, will be damaged if water, consisting of polarizable molecules, infiltrates into them.

To prevent this, the seal structure of this embodiment includes the water-hardening second seal material 80, which is arranged around the liquid crystal layer 50 between the pair of substrates 10 and 20. According to this configuration, water infiltrating the liquid crystal layer 50 from outside the liquid crystal device 60 is absorbed by the second seal material 80, reducing the possibility that the water will infiltrate into the liquid crystal layer 50. This keeps the various functions of the liquid crystal device 60 stable over a long period. In particular, the alignment of the liquid crystals, which have a polarized structure, is prevented from being damaged by infiltration of water, which consists of polarizable molecules. When this liquid crystal device 60 is used as a light-modulation unit, the reliability of the liquid crystal projector is increased.

In the seal structure of this embodiment, the second seal material 80 is arranged around the outer side of the first seal material 19. According to this configuration, the second seal material 80 hardens reliably since it is exposed to the outside. Furthermore, the first seal material 19 touches the liquid crystal layer 50 as in a conventional structure, thereby preventing deterioration of the liquid crystal layer due to the effect of the second seal material 80 and reduction in the reliability of the liquid crystal device 60 caused by such deterioration. Provided that no such problems arise, the second seal material 80 can be arranged along the inner side of the first seal material 19.

Of the various seal functions expected of the first seal material 19 in the seal structure of the embodiment described above, the function of blocking water is complimented by the second seal material 80. A third seal material may be added to enhance this water-blocking function, and to compliment other functions expected from the first seal material 19. Each seal may be added by any procedure permitted by the conditions.

When the seal functions, reliability, and so on obtained by the first seal material 19 can also be achieved by the second seal material 80, it is acceptable to provide only the second seal material 80 instead of the first seal material 19.

Second Embodiment

Figure 9A:
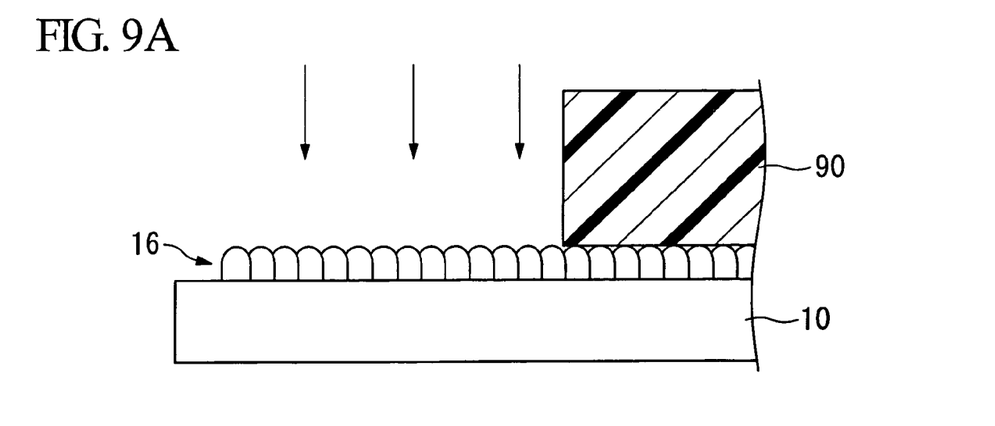
FIGS. 9A, 9B, and 9C are explanatory diagrams showing a seal structure according to the second embodiment.
Figure 9B:
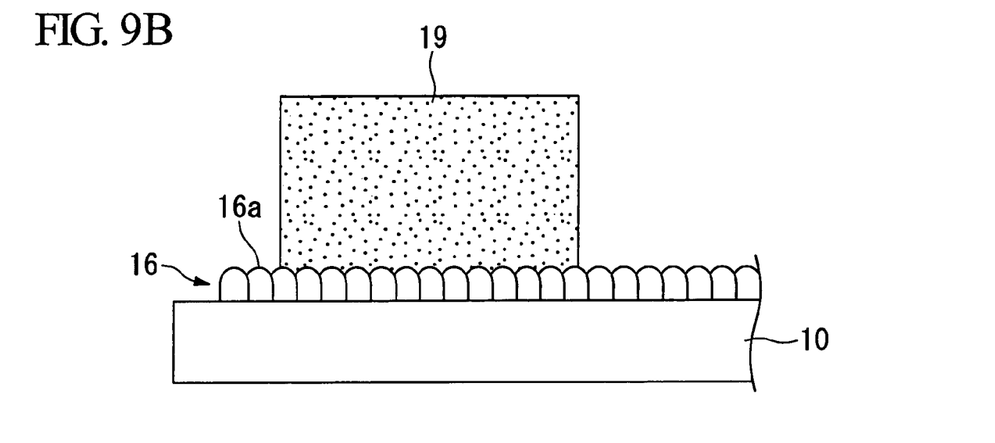
Figure 9C:
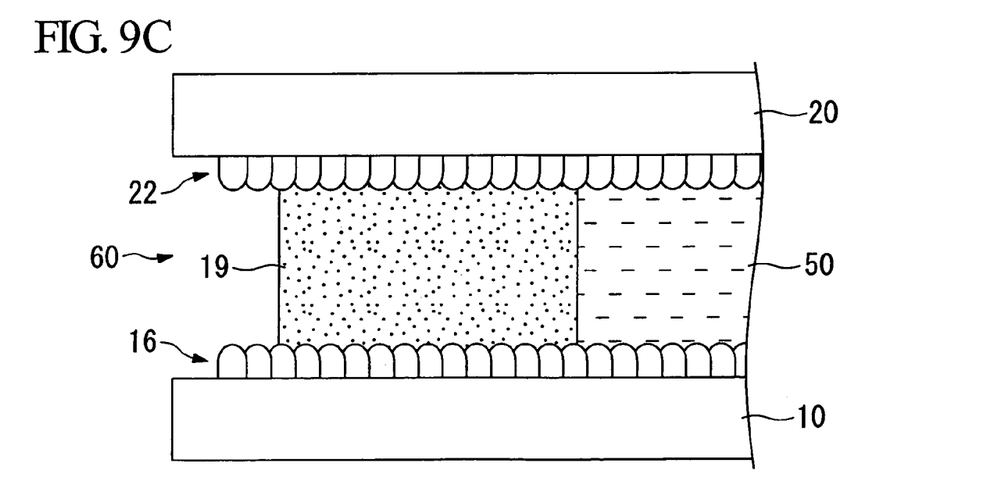

Subsequently, a second embodiment of the invention will be explained. In FIGS. 9A to 9C, a manufacturing method of a liquid crystal device according to the second embodiment is used in manufacturing a liquid crystal device 60, which includes a liquid crystal layer 50 sealed between a TFT array substrate 10 (first substrate) and an opposing substrate 20 (second substrate). The manufacturing method includes a step of joining together the substrate 10 and the substrate 20 with a first seal material 19 therebetween, and a step of imparting affinity for the first seal material 19 to an alignment region of the seal material 19 on the surfaces of the inorganic alignment films 16 and 22 which are formed on the substrates 10 and 20. Parts of the configuration which are similar to those of the first embodiment are simplified or not explained further.

Liquid Crystal Device

Figure 8:
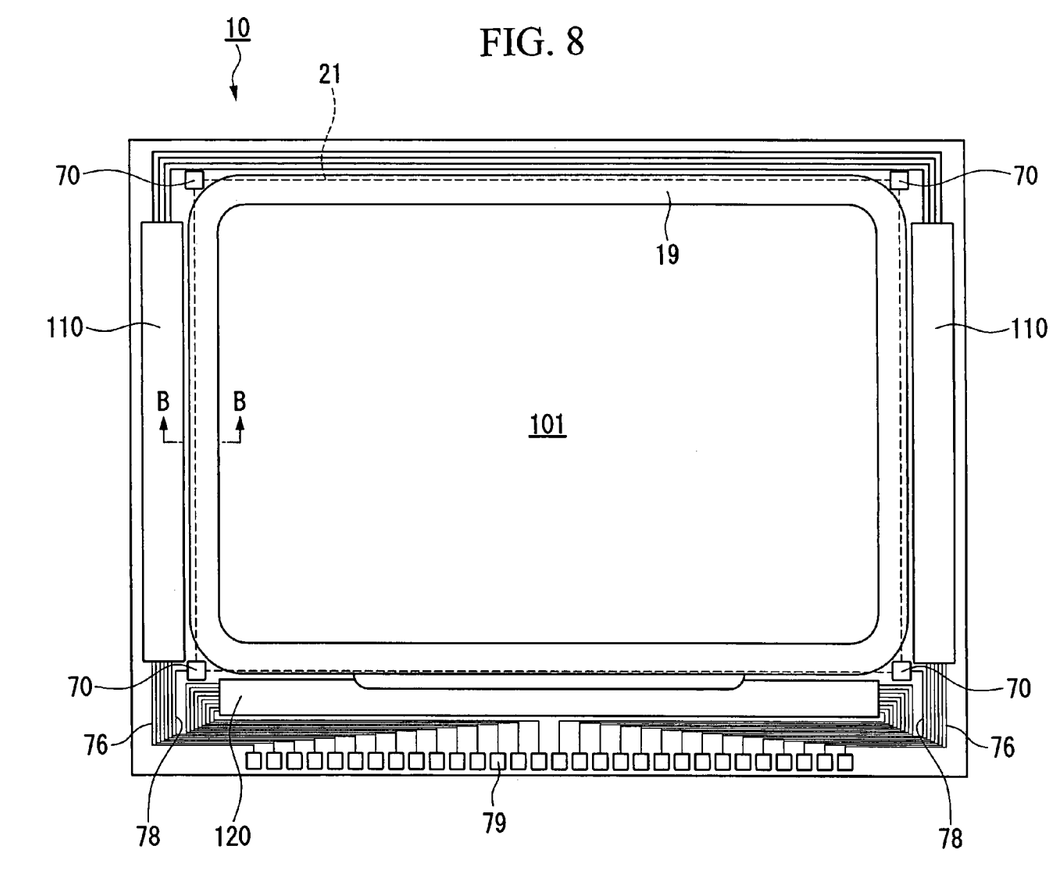
FIG. 8 is a plan view showing a TFT array substrate of a liquid crystal device according to a second embodiment.

FIG. 8 is a plan view of a TFT array substrate of a liquid crystal device. An image creation region 101 is formed in the center of the TFT array substrate 10. A seal material 19 is arranged around the peripheral part of the image creation region 101. A liquid crystal layer 50 (see FIG. 9C) is sealed in the image creation region 101. The liquid crystal layer 50 is applied directly over the liquid crystal layer 50, and there are no injection holes in the seal material 19. A scan line drive element 110 which supplies a scan signal to scan lines (explained below) and a data line drive element 120 which supplies an image signal to data lines (explained below) are attached to the outer side of the second seal material 80. The drive elements 110 and 120 are electrically connected to connection terminals 79 of a terminal part of the TFT array substrate 10 by interconnections 76.

A common electrode 21 is formed on the opposing substrate 20 (see FIG. 9C) which is joined to the TFT array substrate 10. The common electrode 21 is formed along almost the entire image creation region 101. Inter-substrate conductive sections 70 are provided at the four corners of the common electrode 21. The inter-substrate conductive sections 70 are electrically connected to the connection terminals 79 by interconnections 78. The liquid crystal device is driven by externally inputting various types of signals and supplying them to the image creation region 101.

Method for Manufacturing Liquid Crystal Device

FIGS. 9A to 9C are explanatory diagrams of a method for manufacturing the liquid crystal device of this embodiment, being side cross-sectional views taken along the line B-B of FIG. 8. As shown in FIG. 8, the seal material 19 is arranged around the peripheral part of the TFT array substrate 10 and a liquid crystal layer is sealed in the center.

In this embodiment, the region of the substrate 10 where the seal material 19 (see FIG. 9B) is arranged is surface-processed as shown in FIG. 9A, the seal material 19 is arranged as shown in FIG. 9B, and the opposing substrate 20 is joined to the substrate 10 to form the liquid crystal device 60.

In FIG. 9A, the substrate 10 is surface-processed. As described above, since the inorganic alignment film 16 is provided on the surface of the substrate 10, the inorganic alignment film 16 is also surface-processed. Preferably, only the region for arranging the seal material 19 (see FIG. 9B) should be surface-processed. It is particularly preferable that the surface processing does not reach the region for forming the liquid crystal layer 50 (see FIG. 9C). Accordingly, the surface is processed after providing a mask 90 over the regions other than the one for arranging the seal material 19. A photoresist, a hard mask, or such like, can be used as this mask 90. Surface-processing only the region for arranging the seal material 19 prevents regions other than this one from becoming active and obtaining moisture-absorbing properties. In particular, preventing the region for forming the liquid crystal layer 50 from obtaining moisture-absorbing properties reduces the possibility that water, impurities, and such like, will infiltrate the liquid crystal layer 50.

The abovementioned surface processing should preferably be performed by irradiating light. Specifically, it should be performed with infrared rays emitted from an infrared lamp or the like. Infrared rays break down and remove organic substances and the like which stick to the surface of the substrate 10, activating the surface of the inorganic alignment film 16 formed on the substrate 10. This increases the affinity of the inorganic alignment film 16 for the seal material 19. Electron rays, laser rays, and such like, can be used together with or instead of infrared rays.

The surface processing may consist of plasma processing. For example, when using oxygen gas, the processing conditions are as follows: plasma power is between 50 and 1000 W, the flow volume of the oxygen gas is between 50 and 100 ml/min, the delivery speed of the substrate with respect to the plasma-discharging electrode is between 0.5 and 10 mm/sec, and the temperature of the substrate is between 70 and 90° C. Plasmazation of oxygen gas produces excited-state active species such as oxygen ions and oxygen radicals. The surface of the inorganic alignment film 16 is made active by breaking down and removing organic substances and the like which are formed when these excited-state active species stick to the surface of the substrate 10. This increases the affinity of the inorganic alignment film 16 for the seal material 19. An inactive gas such as Ar gas or $N_2$ gas can be used instead of oxygen gas. The plasma processing may be performed in a vacuum or in the atmosphere. It is also acceptable to use ozone gas and the like created by oxygen plasma.

The surface processing may consist of HMDS (hexamethyldisilazane; $(CH_3)_3$ Sin HSi $(CH_3)_3$) processing. Specifically, the substrate 10 is exposed to HMDS vapor filled in a receptacle, thereby forming a coating of HDMS over the surface of the inorganic alignment film 16. This increases the affinity of the inorganic alignment film 16 for the seal material.

The surface processing may consist of applying a surface-modifying agent to the substrate 10 by coating or gas phase film-growth. The surface-modifying agent used is one which forms a monomolecular film by bonding with the silanol group (Si—O—H) of the surface of the inorganic alignment film 16. Specifically, a silane coupling agent such as chlorosilane, aminosilane, alkoxysilane, and silazane, can be used. Alternatively, an alcohol type such as decyl alcohol, octadecyl alcohol (one with a good carbon chain), and isopropyl alcohol (IPA), can be used. An interfacial activator type with a hydrophobic radical can also be used. Each of these can modify the surface of the inorganic alignment film 16 by replacing its hydroxyl group with a hydrophobic group, increasing the affinity of the inorganic alignment film 16 with the seal material 19 which consists of a resin material or the like.

The mask 90 is removed after the inorganic alignment film 16 has been surface-processed.

As shown in FIG. 9B, the seal material 19 is then applied over the surface of the inorganic alignment film 16 which has been surface-processed. The seal material 19 is made by mixing a hardening agent in a heat-hardening resin such as epoxy, or by further mixing an ultraviolet-curing resin such as acryl. Conductive particles may be dispersed into the seal material 19 in order to ensure conduction with the opposing substrate. The seal material 19 is applied along the peripheral part of the substrate 10 using a dispenser or the like.

Since the inorganic alignment film 16 of FIG. 5B consists of the column-like structural bodies 16a of an inorganic substance, the inorganic alignment film has poor affinity for the seal material 19, which consists of a resin material or the like. Consequently, there is a possibility that a comparatively large gap will form at the interface between the inorganic alignment film 16 and the seal material 19. Furthermore, it is difficult to fill the gaps between the column-like structural bodies 16a of the inorganic alignment film 16 with the seal material 19. There is a possibility that water, impurities, and such like from outside the liquid crystal device will seep through these gaps and infiltrate the liquid crystal layer.

In contrast in the embodiment of FIG. 9B, the inorganic alignment film 16 has high affinity for the seal material 19. Consequently, the seal material 19 soaks widely over the surface of the inorganic alignment film 16 and fills the gaps between the column-like structural bodies 16a which include it. Therefore, the possibility that water, impurities, and such like will infiltrate the liquid crystal layer via the gaps between the column-like structural bodies 16a of the inorganic alignment film 16 is low.

The seal material 19 should preferably be applied after reducing the viscosity of the seal material 19 by heating or the like. This enables the seal material to be reliably filled in the gaps between the column-like structural bodies 16a of the inorganic alignment film.

Next, in FIG. 9C, the inner side of the seal material 19 is coated with liquid crystal. The liquid crystal can be applied using an inkjet method or the like. The TFT array substrate 10 and the opposing substrate 20 are positioned and joined together, and the seal material 19 is hardened. The region of the opposing substrate 20 where the seal material 19 will be formed should also be surface-processed beforehand.

The liquid crystal device of this embodiment is completed by the above steps.

As described in detail above, the manufacturing method for liquid crystal device of this embodiment reduces the possibility that water, impurities, and such like will infiltrate the liquid crystal layer 50. As a result, the various functions of the liquid crystal device 60 can be stably maintained over a long period. In particular, damage to the alignment of the liquid crystals, which have a polarized structure, caused by infiltration of water, which consists of polarizable molecules, is prevented. When this liquid crystal device 60 is used as a light-modulation unit, the reliability of the liquid crystal projector is increased.

While in the above explanation, the inorganic alignment films 16 and 22 are provided over the entire surfaces of the substrates 10 and 20 rather than only over the region for forming the liquid crystal layer 50, there are cases where an inorganic alignment film is provided only over the region for forming the liquid crystal layer 50 and not over the region for arranging the seal material. That is, there are cases where a transparent conductive film of ITO or the like is exposed in the region for arranging the seal material, and conductive particles which are dispersed into the seal material are made to touch the top of the transparent conductive film, thereby ensuring conductivity between the substrates. If sputtering of ITO or the like is used, the transparent conductive film will include column-like structural bodies as before. Consequently, there is a possibility that a comparatively large gap will be formed at the interface between the transparent conductive film and the seal material. It is therefore preferable to use the manufacturing method for liquid crystal device of this embodiment even when the inorganic alignment film is not formed in the region for arranging the seal material. This prevents a comparatively large gap from being formed at the interface between the transparent conductive film and the seal material, and reduces the possibility that water, impurities, and such like will infiltrate the liquid crystal layer.

Projector

Figure 10:
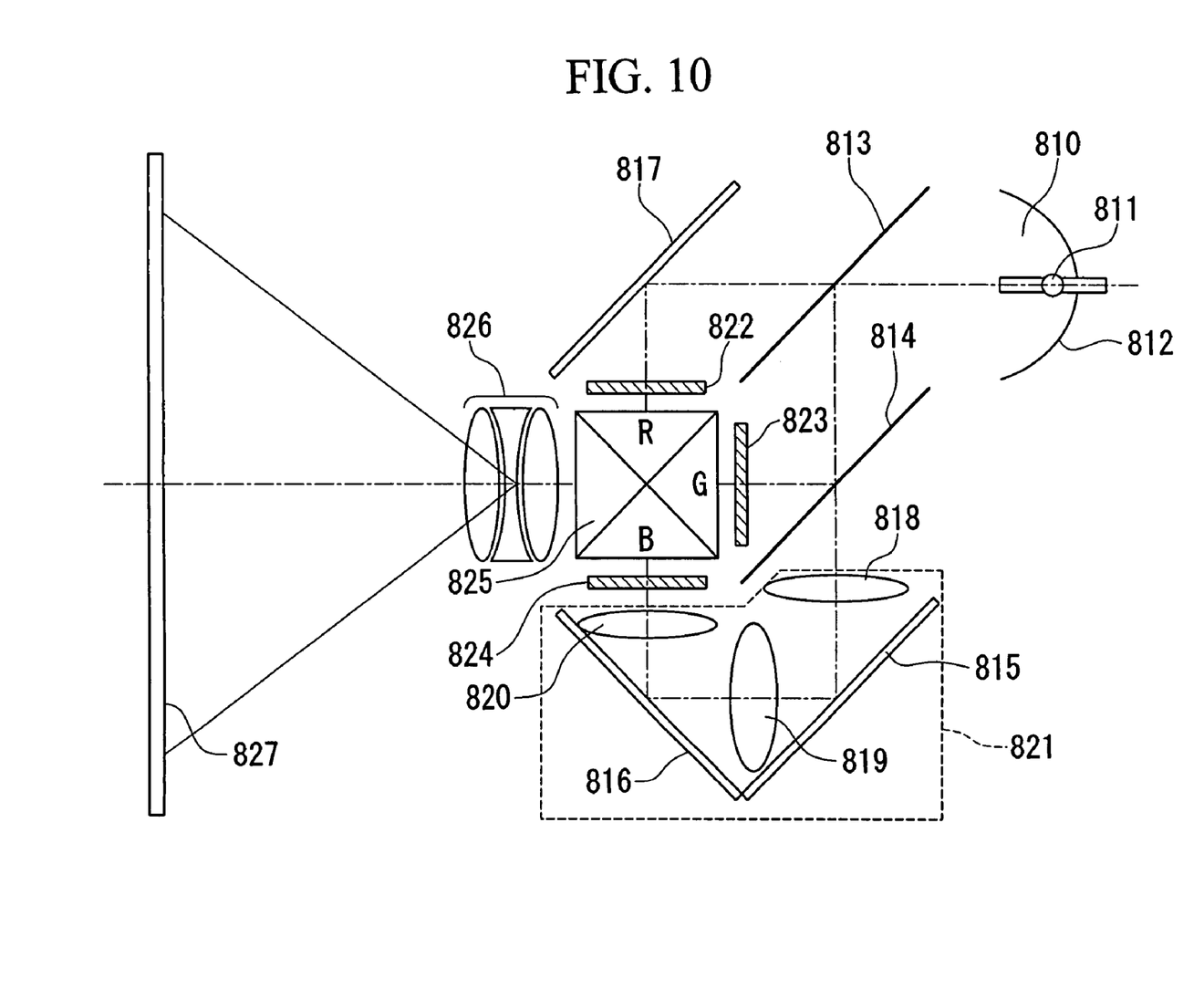
FIG. 10 is a schematic view showing the configuration of primary parts of a projector.

Subsequently, a projector of this invention will be explained using FIG. 10. FIG. 10 is a schematic view of the configuration of primary parts of a projector. This projector includes the liquid crystal device according to the abovementioned embodiments as a light-modulation unit.

In FIG. 10, reference symbol 810 denotes a light source, reference symbols 813 and 814 denote dichroic mirrors, reference symbols 815, 816, and 817 denote reflecting mirrors, reference symbol 818 denotes an incident lens, reference symbol 819 denotes a relay lens, reference symbol 820 denotes an output lens, reference symbols 822, 823, and 824 denote light-modulation units consisting of the liquid crystal device of this invention, reference symbol 825 denotes a cross-dichroic prism, and reference symbol 826 denotes a projection lens. The light source 810 consists of a lamp 811 such as a metal halide lamp and a reflector 812 which reflects light from the lamp.

The dichroic mirror 813 transmits red light contained in white light from the light source 810, while reflecting blue light and green light. The transmitted red light is reflected by the reflection mirror 817 and is incident upon the light-modulation unit for red light 822. The green light reflected by the dichroic mirror 813 is reflected by the dichroic mirror 814 and is incident upon the light-modulation unit for green light 823. The blue light reflected by the dichroic mirror 813 is transmitted through the dichroic mirror 814. A light-guiding unit 821 is provided to prevent light loss of the blue light over a long optical path, and consists of a relay lens system which includes the incident lens 818, the relay lens 819, and the output lens 820. The blue light passes via the light-guiding unit 821 and is incident upon the light-modulation unit for blue light 824.

The three colors of light which are modulated by the light-modulation units 822, 823, and 824 are incident upon the cross-dichroic prism 825. This cross-dichroic prism 825 is made by joining together four right-angled prisms, with a dielectric multilayer which reflects red light and a dielectric multilayer which reflects blue light being formed in an X-shape at the interfaces. These dielectric multilayers combine the three colors of light, obtaining light which expresses a color image. A projection optical system consisting of the projection lens 826 projects the combined light onto a screen 827, where the image is displayed in enlargement.

The abovementioned projector includes the liquid crystal device of the above embodiments as its light-modulation units. Since the light-modulation units of the embodiments have inorganic alignment films with excellent light-resistant and heat-resistant properties, the inorganic alignment films do not deteriorate due to strong light and heat emitted from the light source. There is a low possibility that water and such like will infiltrate through the gaps formed at the interface between the seal material and the inorganic alignment film and in the inorganic alignment film itself. The alignment control function of the liquid crystal polymers in the liquid crystal device can therefore be stably maintained over a long period, making the projector highly reliable.

The technical scope of the present invention is not limited to the embodiments described above, and various modifications can be made without departing from the spirit of the invention. For example, while the foregoing embodiments describe examples where a liquid crystal device includes a TFT as its switching element, the invention can also be applied in a liquid crystal device which includes a two-terminal element such as a thin film diode as its switching element. While the embodiments describe examples using a transparent-type liquid crystal device, this invention can also be applied in a reflection-type liquid crystal device. While the embodiments describe examples where the liquid crystal devices function in twisted nematic (TN) mode, the invention can also be applied in a liquid crystal device which functions in vertical alignment (VA) mode. While the embodiments describe examples using a three-plate projection-type display device (projector), the invention can also be applied in a single-plate projection-type display device and a direct-view-type display device.

The liquid crystal device of this invention can also be applied in electronic devices other than projectors. One specific example is a mobile telephone. This mobile telephone includes a display unit which consists of the liquid crystal device according to the abovementioned embodiments or a modification thereof. Other examples of suitable electronic devices are IC cards, video cameras, personal computers, head mount displays, facsimile devices with display functions, finders of digital cameras, mobile televisions, DSP devices, PDAs, electronic notebooks, electrical bulletin boards, and advertisement displays.

What is claimed is:

1. A liquid crystal device, comprising:
   a pair of substrates;
   a liquid crystal layer arranged between the pair of substrates;
   a first seal material arranged around the liquid crystal layer between the pair of substrates and seals the liquid crystal layer; and
   a second seal material arranged around the liquid crystal device between the pair of substrates and has water-hardening properties, the second seal material having a metal alkoxide as its main compound.

2. The liquid crystal device according to claim 1, wherein the second seal material is arranged on an outer side of the first seal material.

3. A method for manufacturing a liquid crystal device in which a liquid crystal layer is sealed between a pair of substrates, comprising:
   joining the pair of substrates together with a first seal material therebetween; and
   arranging a second seal material that has water-hardening properties around the liquid crystal layer between the pair of substrates, the second seal material having a metal alkoxide as its main compound.

4. The method for manufacturing a liquid crystal device according to claim 3, wherein the arranging the second seal material includes inserting a water-hardening material through a gap between the pair of substrates that are joined together with the first seal material therebetween, the water-hardening material being inserted from side faces of the pair of substrates.

5. A method for manufacturing a liquid crystal device in which a liquid crystal layer is sealed between a first substrate and a second substrate, comprising:
   joining together the first substrate and the second substrate with a seal material therebetween; and
   imparting affinity for the seal material to regions of the first substrate and the second substrate where the seal material is arranged, wherein affinity for the seal material is imparted to porous alignment films that are formed on the first substrate and the second substrate.

6. The method for manufacturing a liquid crystal device according to claim 5, wherein affinity for the seal material is imparted only to the regions of the first substrate and the second substrate where the seal material is arranged.

7. The method for manufacturing a liquid crystal device according to claim 5, wherein the imparting affinity for the seal material includes irradiating light onto the first substrate and the second substrate.

8. The method for manufacturing a liquid crystal device according to claim 5, wherein the imparting affinity for the seal material includes plasma-processing the first substrate and the second substrate.

9. The method for manufacturing a liquid crystal device according to claim 5, wherein imparting affinity for the seal material includes applying a surface-modifying agent to the first substrate and the second substrate.

10. A liquid crystal device manufactured using the method for manufacturing a liquid crystal device according to claim 5.

11. A projector comprising the liquid crystal device according to claim 1 as a light-modulation unit.

12. A projector comprising the liquid crystal device according to claim 2 as a light-modulation unit.

13. A liquid crystal device, comprising:
a pair of substrates;
a liquid crystal layer arranged between the pair of substrates;
a first seal material arranged around the liquid crystal layer between the pair of substrates and seals the liquid crystal layer; and
a second seal material arranged around the liquid crystal device between the pair of substrates and has water-hardening properties,
wherein porous alignment films are formed on inner faces of the substrates.

* * * * *